United States Patent
Jain

(10) Patent No.: US 9,546,706 B2
(45) Date of Patent: Jan. 17, 2017

(54) PENDULUM ABSORBER WITH SLIDING JOINT

(71) Applicant: Ford Global Technologies, LLC, Dearborn, MI (US)

(72) Inventor: Abhisek Jain, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 14/254,654

(22) Filed: Apr. 16, 2014

(65) Prior Publication Data

US 2015/0300437 A1    Oct. 22, 2015

(51) Int. Cl.
*F16F 7/10* (2006.01)
*F16F 15/14* (2006.01)
*F16F 7/116* (2006.01)

(52) U.S. Cl.
CPC .............. *F16F 7/10* (2013.01); *F16F 7/116* (2013.01); *F16F 15/145* (2013.01)

(58) Field of Classification Search
CPC ........... F16F 15/14; F16F 15/145; F16F 7/116
See application file for complete search history.

(56) References Cited

U.S. PATENT DOCUMENTS

| | | | | |
|---|---|---|---|---|
| 1,701,596 A | * | 2/1929 | Vincent | F16F 15/3153 74/574.2 |
| 3,296,887 A | * | 1/1967 | Larsen | F16F 15/1202 192/201 |
| 5,269,197 A | * | 12/1993 | Yang | F16F 15/31 74/570.2 |
| 8,424,659 B2 | * | 4/2013 | Otanez | F16F 15/1421 188/378 |
| 8,561,499 B1 | | 10/2013 | Schiemann et al. | |
| 2013/0233125 A1 | | 9/2013 | Jung et al. | |
| 2014/0013899 A1 | * | 1/2014 | Krause | F16F 15/145 74/574.2 |
| 2015/0101451 A1 | * | 4/2015 | Volpert | F16F 15/145 74/574.2 |
| 2015/0204416 A1 | * | 7/2015 | Schnaedelbach | F16F 15/145 74/574.2 |

FOREIGN PATENT DOCUMENTS

WO    WO 2014005907 A1 *  1/2014  ............ F16F 15/145

* cited by examiner

*Primary Examiner* — Bradley King
(74) *Attorney, Agent, or Firm* — James Dottavio; Alleman Hall McCoy Russell & Tuttle LLP

(57) ABSTRACT

A pendulum absorber assembly including a rotor coupled to a rotating shaft, a pendulum absorber moveably coupled to the rotor and including a preloaded sliding joint coupled to a first counterbalancing section and a second counterbalancing section, the preloaded sliding joint configured to urge the first counterbalancing section away from the second counterbalancing section, and two pins, each of the pins coupled to a different counterbalancing section and the rotor.

20 Claims, 2 Drawing Sheets

PENDULUM ABSORBER WITH SLIDING JOINT

FIELD

The present disclosure relates to a pendulum absorber with a sliding joint and a method for operation of the pendulum absorber.

BACKGROUND AND SUMMARY

Centrifugal pendulum absorbers are used in machines to reduce vibrations (e.g., torsional vibrations) of rotating components. In engines crankshafts, flywheels, etc., may generate torsional vibration. Centrifugal pendulum absorbers may be placed in engines to attenuate the torsional vibration. As a result, noise, vibration, and harshness (NVH) is decreased in the engine. Specifically, pendulum absorbers may be coupled to a crankshaft or a flywheel to dampen torsional vibrations, thereby increasing component longevity and decreasing engine noises.

US 2013/0233125 discloses a centrifugal pendulum absorber in an engine. The centrifugal pendulum absorber includes a preloaded spacing element placed between separate pendulum absorber elements to restrict movement (e.g., lock-up) of the pendulum absorber elements, thereby reducing NVH during low speed operation. The Inventors have recognized several drawbacks with centrifugal pendulum absorber disclosed in US 2013/0233125. For instance, the longevity of the spacing element in the absorber may be limited. In particular, the lifespan of spacing element may less than the other components in the pendulum absorber.

As such in one approach, a pendulum absorber assembly is provided. The pendulum absorber assembly includes a rotor coupled to a rotating shaft, a pendulum absorber moveably coupled to the rotor and including a preloaded sliding joint coupled to a first counterbalancing section and a second counterbalancing section, the preloaded sliding joint configured to urge the first counterbalancing section away from the second counterbalancing section, and two pins, each of the pins coupled to a different counterbalancing section and the rotor. In one example, each counterbalancing section includes a counterbalance pin opening mated with a corresponding pin. The preloaded sliding joint enables a constant force to be exerted on the pin openings by the pins during low speed operation of the crankshaft to reduce vibration caused by play between the pins and pin openings. In other words, the float of the pin in the pin opening is substantially inhibited at low engine speeds. As a result, NVH generated by the drive-train is reduced, thereby increasing customer satisfaction and increasing transmission longevity.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

A pendulum absorber having a preloaded sliding joint configured to urge two counterbalancing masses away from one another is described herein. This functionality of the sliding joint enables the counterbalancing masses to be spaced away from one another during low speed operation to maintain contact between pins and pin openings in the pendulum absorber. Consequently, noise and vibration caused by play between the pins and the pin openings in the pendulum absorber is reduced (e.g., substantially inhibited), during low speed operation, for example. As a result, noise, vibration, and harshness (NVH) generated by the pendulum absorber is reduced, thereby increasing component longevity. It will be appreciated that the counterbalancing masses may be urged away from one another in a direction perpendicular to a direction of the movement of the counterbalancing masses cause by centrifugal forces, in one example. In this way, movement of the counterbalancing masses away from one another does not significantly alter the center of mass of the pendulum absorber at low rotational speeds.

Figure 1:
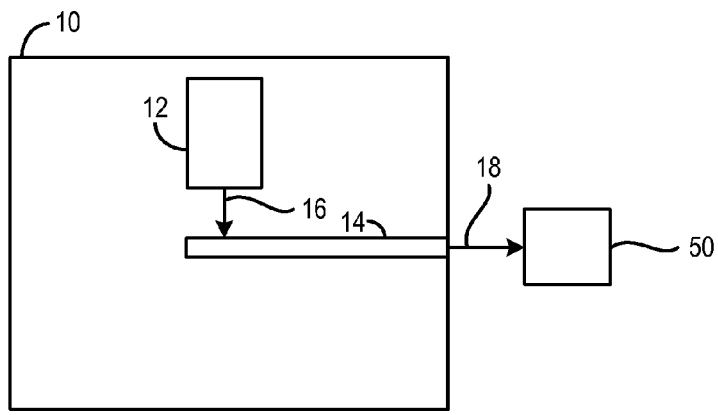
FIG. 1 shows a schematic depiction of an engine and pendulum absorber assembly.

FIG. 1 shows a schematic depiction of an engine 10. The engine includes a cylinder 12. The engine 10 is configured to implement combustion operation, such as 4-cycle combustion operation. The engine 10 may also include intake and exhaust valves coupled to the cylinder 12.

In one example, during engine operation, a cylinder piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke. During cylinder combustion, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced. It will be appreciated that the above combustion cycles are exemplary and other types of combustion cycles in the engine have been contemplated.

The cylinder 12 is configured to transfer energy to a crankshaft 14, denoted via arrow 16. This may be accomplished via a piston rod coupled to a piston reciprocating in the cylinder. It will be appreciated one or more crankshaft bearings coupled to the crankshaft enable the crankshaft to rotate and provide support to the crankshaft.

The engine 10 is configured to generate a rotational output. One or more components may provide the rotational output to components external to the engine, denoted via arrow 18. It will be appreciated that the rotational output components may include a flywheel coupled to the crankshaft 14. A pendulum absorber assembly 50 is coupled to the rotational output component(s). However in other examples, the pendulum absorber assembly may be coupled directly to the crankshaft 14. The pendulum absorber assembly 50 may be referred to as a centrifugal pendulum absorber assembly, in one example. Furthermore, the pendulum absorber assembly may also be used to dampen torsional vibration generated in other rotating shafts in the engine or vehicle. Thus, the pendulum absorber assembly 50 may generally be coupled to a rotating shaft and therefore, arrow 18 may represent a rotating shaft, in one example. Additionally, the rotational output components 18 and/or pendulum absorber assembly 50 may be included in a vehicle transmission, in one example.

It will be appreciated that the engine 10 may include additional components which are not depicted, such as an intake system configured to provide air to the cylinder 12 and an exhaust system configured to receive exhaust gas from the cylinder 12. Exemplary components which may be included in the aforementioned systems include throttles, conduits, manifolds, emission control devices, etc. The engine 10 may also include a fuel delivery system configured to provide fuel to the cylinder 12. Additionally, the engine 10 may be included in a vehicle and may be configured to provide motive power thereto.

Figure 2:
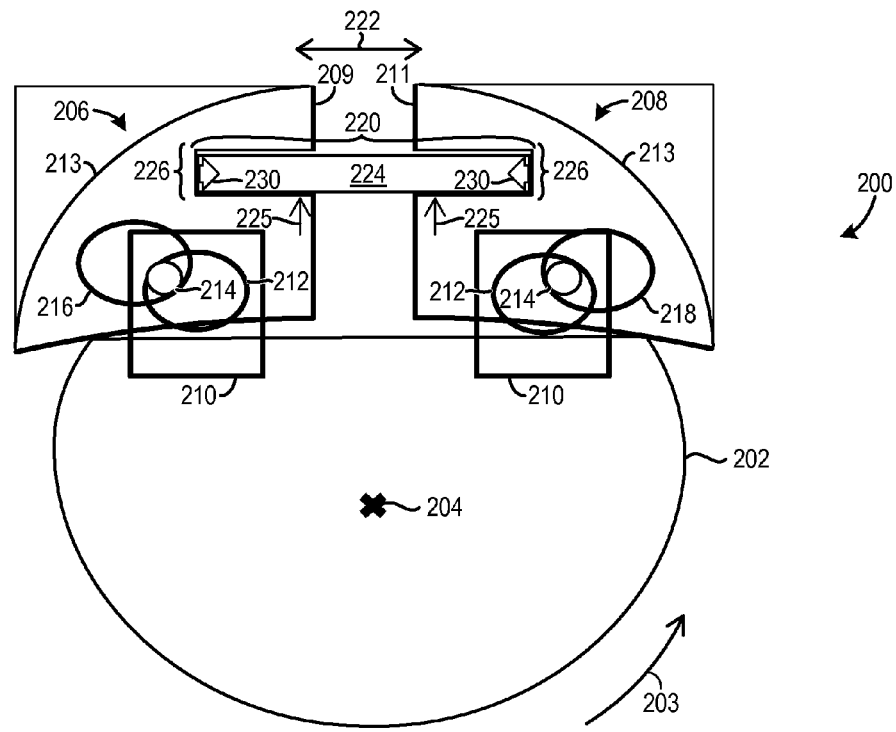
FIG. 2 shows an illustration of a pendulum absorber in a first configuration.
Figure 3:
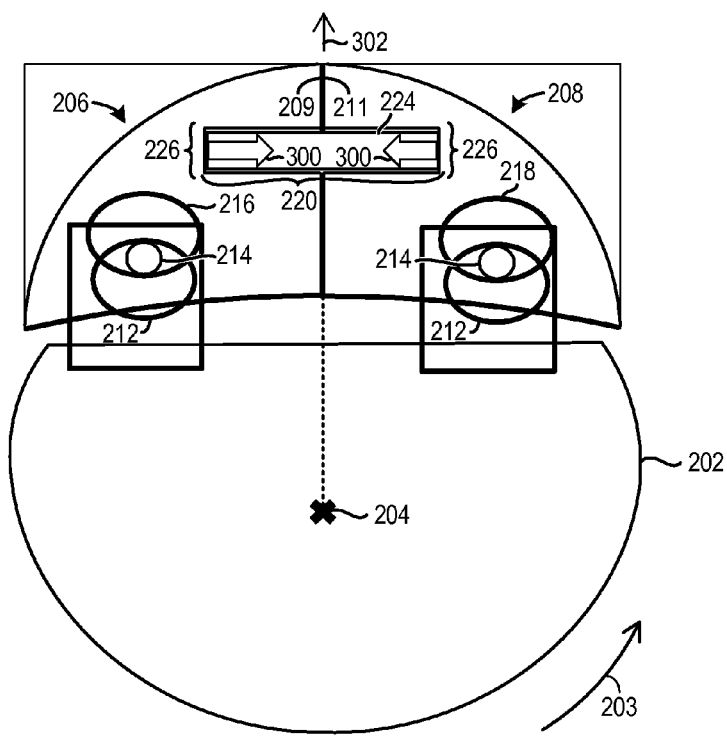
FIG. 3 shows an illustration of a pendulum absorber in a second configuration.

FIGS. 2 and 3 show an illustration of an example pendulum absorber assembly 200 in different operating configurations. The pendulum absorber assembly 200 shown in FIGS. 2-3 may be the pendulum absorber assembly 50, shown in FIG. 1. Therefore, it will be appreciated that the pendulum absorber assembly 200 may be coupled to a rotating shaft (e.g., rotating shaft 18, shown in FIG. 1). Specifically, FIG. 2 shows the pendulum absorber assembly 200 in a first configuration and FIG. 3 shows the pendulum absorber assembly 200 in a second configuration. In one example, the pendulum absorber assembly is in the first configuration when the assembly is rotating at a speed less than a threshold value, including 0 revolutions per minute (RPM), and the pendulum absorber assembly is in the second configuration when the assembly is rotating at a speed greater than the threshold value.

The pendulum absorber assembly 200 includes a rotor 202. The rotor 202 is coupled to a rotating shaft, as previously discussed. Additionally, the rotor 202 rotates about rotational axis 204. Arrow 203 depicts an example direction of rotation of the rotor 202. However, in other examples the rotor 202 may rotate in a clockwise direction. The pendulum absorber assembly 200 further includes a first counterbalancing section 206 and a second counterbalancing section 208. Each of the counterbalancing sections is a separate continuous mass, in the depicted example. Additionally, the first counterbalancing section is identical in geometry and size to the second counterbalancing section. However, other geometries of each of the counterbalancing sections have been contemplated.

The counterbalancing sections may be weighted similarly and therefore have substantially identical centers of mass. Thus, a location of the center of mass within the first counterbalancing section may be substantially identical to a location of the center of mass within the second counterbalancing section. Additionally, the first counterbalancing section 206 includes a planar side 209. Likewise the second counterbalancing section 208 includes a planar side 211. It will be appreciated that the planar sides are peripheral surfaces. As shown, the counterbalancing sections are spaced away from one another in the depicted example. Specifically, the planar sides 209 are spaced away from one another as well as parallel to one another. However, it will be appreciated that the surfaces in the counterbalancing sections may have alternate contours, in other examples. Additionally, the counterbalancing sections (206 and 208) have curved peripheral surfaces 213.

The first and second counterbalancing sections (206 and 208) are movably coupled to the rotor 202. Extensions 210 are fixedly coupled to the rotor 202. It will be appreciated that the extensions 210 may be included in the rotor 202. The extensions 210 include rotor pin openings 212. In particular, each extension includes a single rotor pin opening, in the depicted example. Thus, there are two rotor pin openings in the pendulum absorber assembly 200. The first rotor pin opening coupled to the first counterbalancing section 206 and the second rotor pin opening coupled to the second counterbalancing section 208. It will be appreciated that the boundaries of the rotor pin openings 212 are defined by the contours of the extensions 210. The rotor pin openings 212 have an oval cross-section, in the depicted example. However, other shapes have been contemplated. For instance, the openings may have a circular cross-section.

Pins 214 are mated with the rotor pin openings 212. Thus, a single pin is partially enclosed by each of the rotor pin openings. Additionally, the pins 214 are also mated with openings included in the counterbalancing sections. Specifically, one of the pins 214 is mated with a first counterbalance pin opening 216 included in the first counterbalancing section 206 and one of the pins 214 is mated with a second counterbalance pin opening 218 included in the second counterbalancing section 208. The pins 214 may be cylindrical in shape. However, other suitable pin shapes may be used, in other examples.

The connection between the pins 214, the rotor pin openings 212, and the counterbalance pin openings (216 and 218) form the moveable connection between the rotor 202 and the first and second counterbalancing sections (206 and 208). As shown, the pins 214 are smaller than the rotor pin openings 212 and the counterbalance pin openings (216 and 218). Thus, the pins 214 have backlash with regard to the aforementioned openings. In other words, there is play between the pin openings and the pins. Therefore, each of the pins 214 has a smaller cross-sectional area than a cross-sectional area of the corresponding counterbalance pin opening. The cross-sectional area of the pins and pin openings may be measured via a cutting plane perpendicular to the rotational axis 204. It will be appreciated that this play between the pin and pin openings enables movement of the counterbalancing sections. The counterbalancing sections (206 and 208), when in contact with each other, move together under the influence of torsional vibrations. Thus, the counterbalancing sections come together and join when experiencing high centrifugal forces, thereby attenuating torsional vibration generated by the rotating shaft coupled to the rotor 202. As a result, NVH is reduced, thereby increasing component longevity and customer satisfaction.

Additionally the pendulum absorber assembly 200 includes a preloaded sliding joint 220 moveably coupled to the first counterbalancing section 206 and the second counterbalancing section 208. The preloaded sliding joint 220 is configured to urge the first counterbalancing section 206 away from the second counterbalancing section 208. Specifically, the preloaded sliding joint 220 urges the first counterbalancing section 206 away from the second counterbalancing section 208 in the directions indicated via arrows 222. The directions 222 are perpendicular to the planar sides 209 and 211. Specifically, the preloaded sliding joint 220 urges the first counterbalancing section away from the second counterbalancing section in a direction perpendicular to a direction of movement of the sections cause by centrifugal forces indicated via arrows 225. It will be appreciated that the directions indicated via arrows 222 are not radially aligned and therefore in a non-radial direction. However, other sliding joint configurations have been contemplated.

The preloaded sliding joint 220 may include a spring 224 (e.g., coil spring) to provide the aforementioned functionality, such a preloading. It will be appreciated that the spring 224 may include a housing guiding movement of the spring as well as providing increased structural integrity to the spring. The spring 224 extends into spring recesses 226 in the first counterbalancing section 206 and the second counterbalancing section 208. Thus, the spring recesses 226 may guide movement of the spring 224. The sliding joint may be in the form of a cylindrical, cubical, or triangular cross-section.

Arrows 230 indicate the compressive force exerted on the spring 224 by the counterbalancing sections (206 and 208) when the assembly is below the threshold speed, including 0 speed. It will be appreciated that the pre-loaded spring 224 exerts opposing forces on the counterbalancing sections (206 and 208). When the centrifugal forces overcome the preloaded spring forces the spring 224 compresses further and the counterbalancing sections move towards one another and eventually contact one another, as shown in FIG. 3. Arrows 300 indicate larger compressive forces exerted on the spring by the counterbalancing sections (206 and 208) due to a higher speed of rotation of the assembly 200. It will be appreciated that the spring is storing energy in this state. The potential energy stored in the spring will quickly separate the two counterbalancing sections when the centrifugal forces on the counterbalancing sections are reduced, due to a reduction in rotational speed of the assembly. In the configuration shown in FIG. 3, the side 209 and 211 are in face sharing contact with one another. However, in other examples the distance between the counterbalancing sections may simply decrease and the sides (209 and 211) may have some separation between them when the rotational speed of the assembly increases. As shown in FIG. 3 the sides (209 and 211) are radially aligned with the rotational axis 204. Additionally, as illustrated in FIG. 3, the first counterbalancing section 206 and the second counterbalancing section 208 each move outward in a radial direction, indicated by arrow 302. The outward movement of the counterbalancing sections is caused by increasing centrifugal forces. This movement ultimately makes the two counterbalancing sections contact each other and makes them one mass (e.g., unified component) which can move together under the influence of torsional vibrations in the rotor. The two counterbalancing sections are held together until the centrifugal force is below a threshold value, calculated based on the threshold RPM required to create the centrifugal force. If the speed decreases, the two counterbalancing sections move away from one another and lock the assembly, hindering the assembly's movement under torsional vibration.

Figure 4:
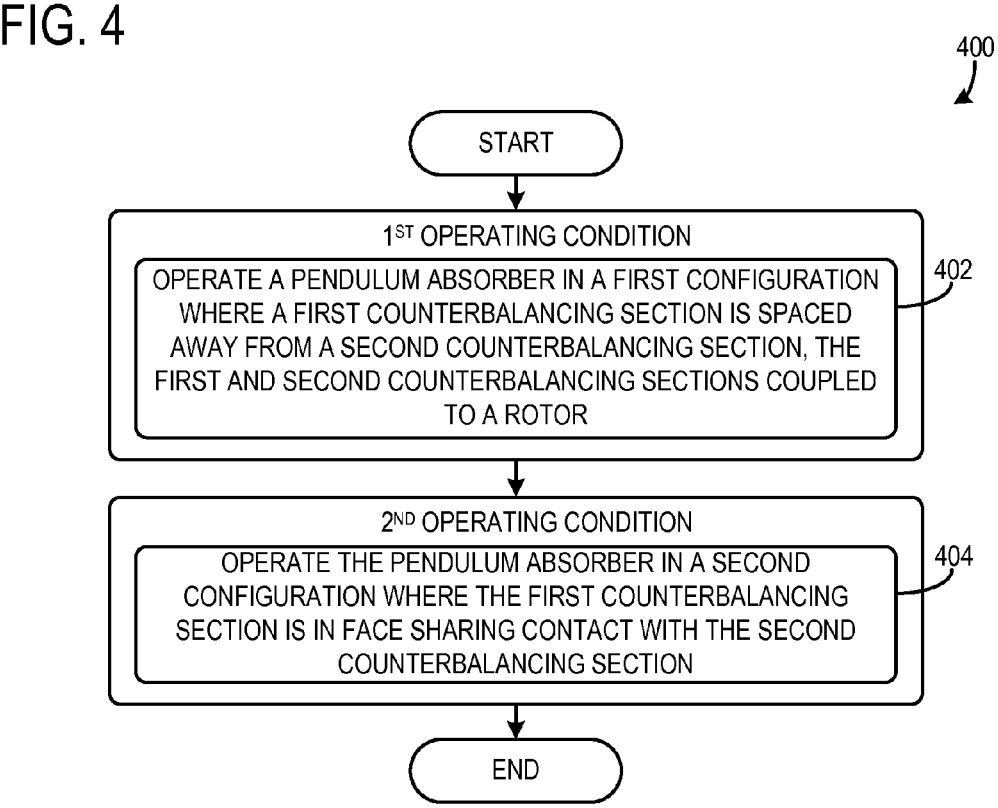
FIG. 4 shows a method for operation of a centrifugal pendulum absorber.

FIG. 4 shows a method 400 for operating a vehicle transmission. The method 400 may be implemented via the pendulum absorber assembly shown in FIGS. 1-3 or may be implemented by another suitable pendulum absorber assembly.

At 402 the method includes operating a pendulum absorber in a first configuration where a first counterbalancing section is spaced away from a second counterbalancing section, the first and second counterbalancing sections movably coupled to a rotor. Next at 404 the method includes operating the pendulum absorber in a second configuration where the first counterbalancing section is in face sharing contact with the second counterbalancing section. In one example, the first operating condition may be a low speed operating condition where the rotor rotates at less than a threshold speed. In such an example, the second operating condition may be a high speed operating configuration where the rotor rotates at greater than a threshold speed. The threshold speed can be set by setting the preloading in the spring. The threshold speed may vary from machine to machine. In an internal combustion engine, the threshold speed may be set 50-100 RPM below the idle speed of the vehicle. It will be appreciated that the first operating condition may be when the centrifugal force on the first and second counterbalancing sections is less than a threshold value and the second operating condition may be when the centrifugal force on the first and second counterbalancing sections is greater than the threshold value. Additionally in one example, the first counterbalancing section is in face sharing contact with the second counterbalancing section in the second configuration. Specifically in one example, planar peripheral surfaces in the first and second counterbalancing sections are in face sharing contact in the second configuration. Further in such an example, the peripheral surfaces may be radially aligned with a rotational axis of the rotor in the second configuration. It will be appreciated that the aforementioned threshold values may be defined by the characteristics of a spring in a preloaded sliding joint coupled to the first and second counterbalancing sections.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but are provided for ease of illustration and description. One or more of the illustrated actions, operations and/or functions may be repeatedly performed depending on the particular strategy being used.

Note that the drawings in FIGS. 2-3, in particular, are not drawn exactly to scale, but do represent relative positioning and spacing of components with respect to one another. Also, components shown directly contacting one another may, in one example, have no further components therebetween. For example, the various pins shown engaging various surfaces may be directly engaging such surfaces without any other components therebetween. As another example, components shown laterally and/or longitudinally aligned or displaced with respect to each may, in one example, be so positioned or located.

As one particular example, a pendulum absorber assembly may comprise a rotor directly coupled with surface-sharing contact to a rotating shaft; a pendulum absorber moveably coupled to the rotor and including a preloaded sliding joint directly coupled to a first counterbalancing section and a second counterbalancing section, the preloaded sliding joint positioned and connected to urge the first counterbalancing section away from the second counterbalancing section; and two pins, each of the pins directly coupled to a different counterbalancing section and the rotor and not coupled to each other. Each and every counterbalancing section may include a counterbalance pin opening mated with a corresponding pin and the rotor may include two rotor pin openings, each rotor pin opening mated only with one of the pins. The first counterbalancing section may be spaced away from the second counterbalancing section when the centrifugal force is less than a threshold value, where the rotating shaft is included in an internal combustion engine of an on-road vehicle. The first counterbalancing section may be identical in geometry and size to the second counterbalancing section, and symmetrically positioned with respect to a centerline and/or axis of rotation. Further, the first and second counterbalancing sections may each be separate continuous masses of unitary material.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A pendulum absorber assembly comprising:
a rotor coupled to a rotating shaft;
a pendulum absorber moveably coupled to the rotor and including a preloaded sliding joint coupled to a first counterbalancing section and a second counterbalancing section, the preloaded sliding joint configured to urge the first counterbalancing section away from the second counterbalancing section; and
two pins, each of the pins coupled to a different counterbalancing section and the rotor, where all counterbalancing sections of the pendulum absorber assembly are configured to move into face sharing contact with each other due to rotor speeds greater than a threshold speed.

2. The pendulum absorber assembly of claim 1, where the preloaded sliding joint urges the first counterbalancing section away from the second counterbalancing section in a direction perpendicular to a direction of movement of the counterbalancing sections cause by centrifugal forces.

3. The pendulum absorber assembly of claim 1, where each counterbalancing section includes a counterbalance pin opening mated with a corresponding pin and the rotor includes two rotor pin openings, each rotor pin opening mated with one of the pins.

4. The pendulum absorber assembly of claim 3, where counterbalance pin openings the rotor pin openings and the pins have backlash.

5. The pendulum absorber assembly of claim 1, where the first counterbalancing section is spaced away from the second counterbalancing section when a centrifugal force is less than a threshold value.

6. The pendulum absorber assembly of claim 5, where the rotating shaft is included in an engine and the threshold value is less than an idle speed of the engine.

7. The pendulum absorber assembly of claim 1, where the first counterbalancing section is identical in geometry and size to the second counterbalancing section.

8. The pendulum absorber assembly of claim 1, where the preloaded sliding joint is preloaded via a spring.

9. The pendulum absorber assembly of claim 8, where the spring is a coil spring.

10. The pendulum absorber assembly of claim 1, where the first and second counterbalancing sections each are separate continuous masses.

11. The pendulum absorber assembly of claim 1, where the preloaded sliding joint extends into recesses in both the first counterbalancing section and the second counterbalancing section.

12. A method for operating a vehicle transmission comprising:
during a first operating condition, operating a pendulum absorber in a first configuration where a first counterbalancing section is spaced away from a second counterbalancing section, the first and second counterbalancing sections movably coupled to a rotor; and
during a second operating condition, operating the pendulum absorber in a second configuration where the first counterbalancing section is in face sharing contact with the second counterbalancing section:
where the first configuration is a low speed configuration and the first operating condition is when the rotor rotates at less than a threshold speed, and where the second configuration is a high speed configuration and the second operating condition is when the rotor rotates at greater than the threshold speed.

13. The method of claim 12, where the threshold speed is defined by characteristics of a spring included in a preloaded sliding joint coupled to the first counterbalancing section and the second counterbalancing section.

14. The method of claim 12, where planar peripheral surfaces in the first and second counterbalancing sections are in face sharing contact in the second configuration.

15. The method of claim 14, where the planar peripheral surfaces are radially aligned with a rotational axis of the rotor in the second configuration.

16. A pendulum absorber assembly comprising:
a rotor coupled to a crankshaft;
a pendulum absorber moveably coupled to the rotor and including a preloaded sliding joint coupled to a first counterbalancing section and a second counterbalancing section, the preloaded sliding joint configured to urge the first counterbalancing section away from the second counterbalancing section in a non-radial direction; and
a first pin and a second pin, each of the pins coupled to a different counterbalancing section and to the rotor, where the first counterbalancing section and the second counterbalancing section are structured to come into face sharing contact due to a centrifugal force overcoming a preloaded sliding joint force.

17. The pendulum absorber assembly of claim 16, where a location of a center of mass within the first counterbalancing section is substantially identical to a location of a center of mass within the second counterbalancing section.

18. The pendulum absorber assembly of claim 16, where each counterbalancing section includes a counterbalance pin opening mated with a corresponding pin, the pins having a smaller cross-sectional area than a cross-sectional area of the counterbalance pin openings.

19. The pendulum absorber of claim 16, where the centrifugal force overcomes the preloaded sliding joint due to a rotational speed of the rotor exceeding a threshold speed.

20. The pendulum absorber of claim 16, where the first pin and the second pin each mate with pin openings in different extensions, the extensions fixedly coupled to the rotor.

* * * * *

UNITED STATES PATENT AND TRADEMARK OFFICE
CERTIFICATE OF CORRECTION

| | |
|---|---|
| PATENT NO. | : 9,546,706 B2 |
| APPLICATION NO. | : 14/254654 |
| DATED | : January 17, 2017 |
| INVENTOR(S) | : Abhisek Jain |

Page 1 of 1

It is certified that error appears in the above-identified patent and that said Letters Patent is hereby corrected as shown below:

In the Claims

Column 7, Line 66, Claim 4, insert --,-- immediately prior to "the rotor pin openings" and insert --,-- immediately after.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*